Feb. 7, 1961 G. W. SODERMAN 2,970,733
WIRE FEEDING APPARATUS
Filed Oct. 2, 1958 2 Sheets-Sheet 1

INVENTOR
G.W. SODERMAN
BY
ATTORNEY

Feb. 7, 1961 G. W. SODERMAN 2,970,733
WIRE FEEDING APPARATUS
Filed Oct. 2, 1958 2 Sheets-Sheet 2

INVENTOR
G.W. SODERMAN
By
ATTORNEY

United States Patent Office 2,970,733
Patented Feb. 7, 1961

2,970,733

WIRE FEEDING APPARATUS

George W. Soderman, Alpine, N.J., assignor to Western Electric Company, Incorporated, New York, N.Y., a corporation of New York Filed Oct. 2, 1958, Ser. No. 764,987

1 Claim. (Cl. 226—149)

This invention relates to wire feeding apparatus particularly apparatus for advancing like lengths of wire to be cut and formed into leads for electrical components.

In conventional wire feeding apparatus, a reciprocating unit usually pushes the wire through a fixed unit and the units are provided with gripping devices, such as balls spring-pressed against inclined raceways which permit the wire to move in one direction, but hold it against movement in the other. With such devices mounted in opposing relation in the two units, each device alternately grips and releases the wire as the movable unit reciprocates to advance the wire through the fixed unit.

This type of feed mechanism necessarily exerts some clamping action on the wire even in the feeding direction but it works satisfactorily for wires having sufficient inherent rigidity to force the wire through the fixed unit against the spring pressure of its gripping device. Such mechanism, however, does not work well on fine gage wires since the force required to overcome even very light springs causes the wire to buckle at times and this difficulty increases as the springs age and lose their resilience.

The object of the present invention is a wire feeding apparatus which is highly efficient in feeding wires of various sizes and wherein the holders for the wires are alternately free of force.

In accordance with the object, the invention comprises a wire feeding apparatus having a fixed position unit with an aperture for a wire therein and a movable unit, with an aligned aperture for the wire, mounted on a carriage reciprocated relative to the fixed unit, each unit having a holder, movably mounted therein to engage the portion of the wire in the aperture thereof, normally free of any applied force so that the wire may move freely past the holders through the apertures when elements therefor are in their normal positions, the elements being responsive to the reciprocal movements of the carriage to force the holders into engagement with their wire portions alternately to cause intermittent feeding of the wire like distances in the given direction while holding the wire in the movable unit and holding the wire, during the reverse movement, by the fixed unit.

More specifically, the holders in the units are pins with rounded ends slidable freely in apertures disposed at right angles to the apertures for the wire and under the control of conical elements which are permitted to move short distances between known limits, one in each instance freeing the pins or holders of any applied force on the wire in each unit and the other applying sufficient force to hold the wire against movement in the unit. The element for the fixed unit is under the control of a gripper carried by the movable unit or the carriage and the element for the movable unit is under the control of a gripper mounted at a fixed position relative to the carriage.

Other objects and advantages will be apparent from the following detailed description when considered in conjunction with the accompanying drawings, wherein.

Figure 1:
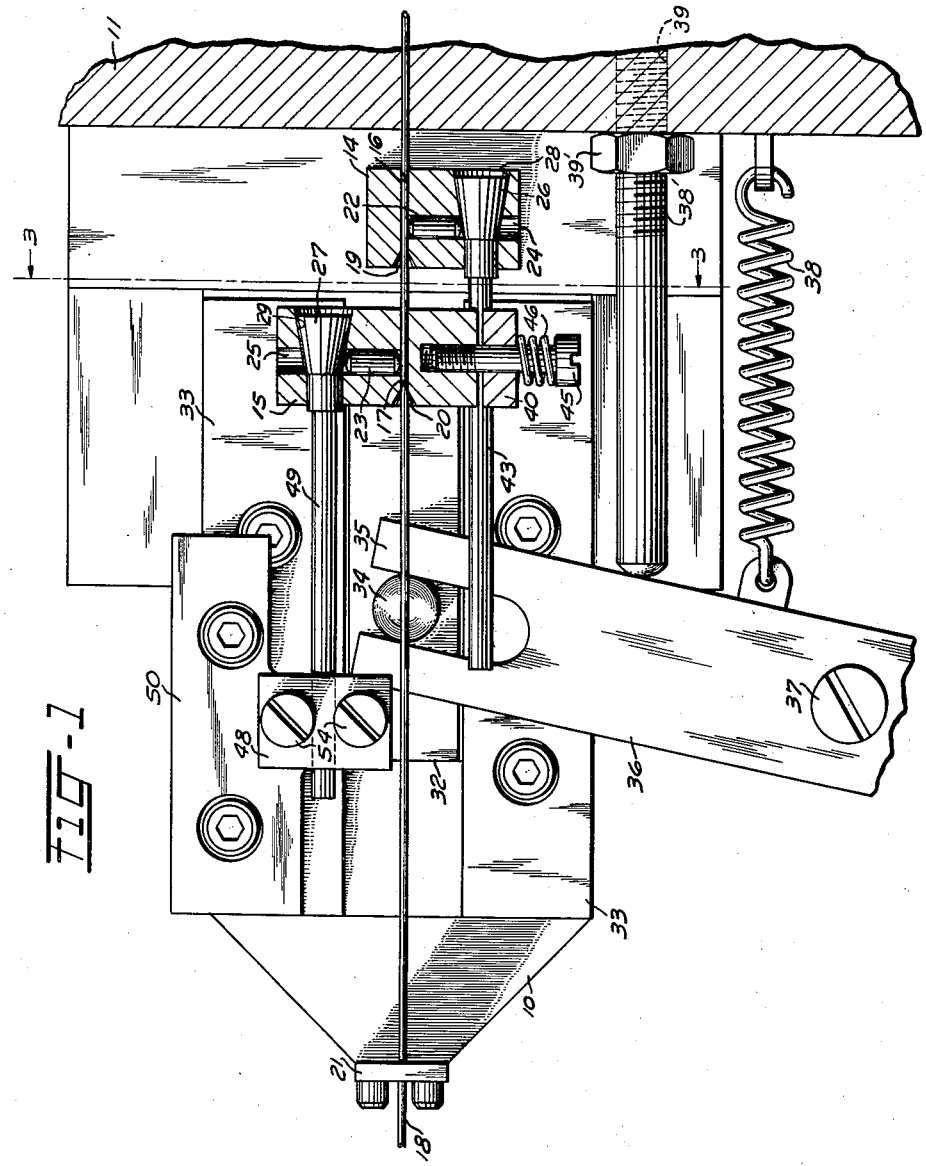
Fig. 1 is a top plan view of the apparatus.
Figure 2:
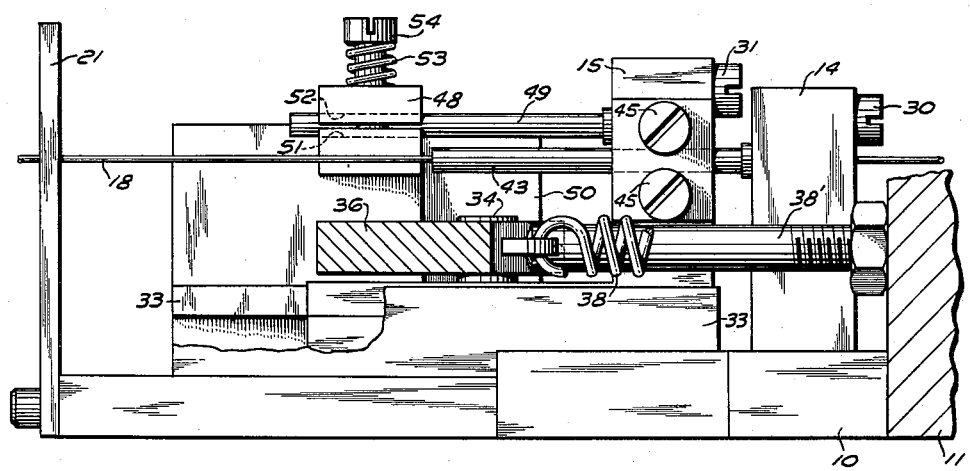
Fig. 2 is a front elevational view of the apparatus shown in Fig. 1.

The apparatus comprises a base member or support 10 which is fixed to a machine 11 for receiving successive lengths of wire, cutting them into predetermined lengths and forming them for use as terminals. The apparatus includes a fixed position unit 14 and a movable unit 15 which are similar in structure in that they have aligned apertures 16 and 17 for a wire 18. The entrance ends for the apertures are tapered at 19 and 20 to facilitate feeding of wire through the apertures. In the present instance the apertures and the wire are shown larger than they are actually, for the purpose of illustration only. The unit 14 is mounted fixedly on the base 10 adjacent the machine 11, and guide 21, to initially guide the wire into the apparatus and hold it above the moving parts in alignment with the apertures 16 and 17, is mounted at the opposite end of the base. The units 14 and 15 have holders 22 and 23 which are in the form of pins constructed from hardened material and provided with rounded ends as illustrated particularly in Fig. 1. The holders 22 and 23 are disposed in apertures 24 and 25 which are of suitable sizes to assure accurate guiding of the holders in their longitudinal movements and prevent any possible freezing of the holders against movement in the apertures. Tapered or conical elements 26 and 27, disposed in similarly shaped apertures 28 and 29, are to operate in conjunction with the holders 22 and 23 so that during short movement of the elements between predetermined limits, the holders in one instance will be free of any applied force and in the other instance the holders will be forced against the wire portions in the apertures 16 and 17 to firmly hold them against movement in the apertures. Heads 30 and 31 of screws disposed in threaded apertures of the units so that the heads will extend downwardly in each instance to be engaged by the outer or right ends of the elements 26 and 27 serve as stops for the outer limits for the elements.

A carriage 32 slidably mounted on the base 10 between guides 33, mounted on the base, has the movable unit 15 mounted thereon adjacent the right hand end thereof. A vertical pin 34 fixed to the carriage 32 is engaged by a truncated end 35 of a lever 36 which is urged normally clockwise about its pivot 37 by a spring 38. When the apparatus is in operation, the lever will be rocked about its pivot through the aid of any suitable means, not shown, such as a cam to move it a given distance away from an adjustable stop 38' and permit the spring 38 to return the lever to the stop to cause the carriage 32 and the movable unit 15, operating in conjunction with the fixed unit 14 to feed predetermined lengths of wire to the machine 11. The adjustable stop 38' has a threaded portion adjustably disposed in a threaded aperture 39 of an adjacent portion of the machine 11. A nut 39' on the threaded portion of the stop serves to lock the stop in desired adjusted positions. The movable unit 15 carries a gripper 40 which has a groove 41 cooperating with a groove 42 in the unit 15 to grip a rod-like projection 43 of the element 26 to bring about movements of the element during movements of the carriage and the movable unit. Screws 45, extending through apertures in the gripper and threadedly mounted in apertures in the movable unit, serve as guides for the gripper 40 while springs 46 apply a predetermined variable force to the gripper to bring about the desired action on the element 26.

A similar gripper 48 for a rod-like projection 49 of the element 27 is mounted at a fixed position relative to the carriage 32. A bracket 50 mounted on the base 10 and/or the guides 33 has a groove 51 cooperating with the groove 52 in the gripper 48 so that the variable forces of springs 53 on guide screws 54 will apply suitable gripping force to the projection 49 of the element 27 to assure movements of the element between its limits in response to the movements of the unit 15.

*Operation*

Let it be assumed that the wire 18 is threaded through the guide 21 and the apertures 17 and 16 of the units 15 and 14. The apparatus is set in operation by energizing the power means for repeatedly rocking the lever 36 about its pivot 37 to produce repeated reciprocating feeding and reverse movements of the carriage 32 and movement of the unit 15 between its predetermined limits relative to the fixed unit 14. With the apparatus in the position shown, let it be assumed that the carriage has just completed its movement to the right advancing the wire a predetermined length. At that position the element 26 will have its right end resting against the head 30 and the element 27 will be in the position shown spaced to the left from its head 31. As soon as the movement to the left begins, the gripper 48 will hold the projection 49 of the element 27 against movement until the head 29 engages the right end of the element and moves it with the unit 15 and the carriage. This brings about an immediate removal of applied force to the holder 23 to free the wire in the aperture 17 during return of the unit 15 to its starting or left position. Considering now the fixed unit 14 at the start of this return movement of the carriage, the gripper 40 in moving to the left will force the element 26 to the left away from its head 30 to the position shown in Fig. 1, where it will force the holder 22 firmly against the wire portion in the aperture 16 to hold the wire against movement to the left as the unit 15 returns to its starting position.

Figure 3:
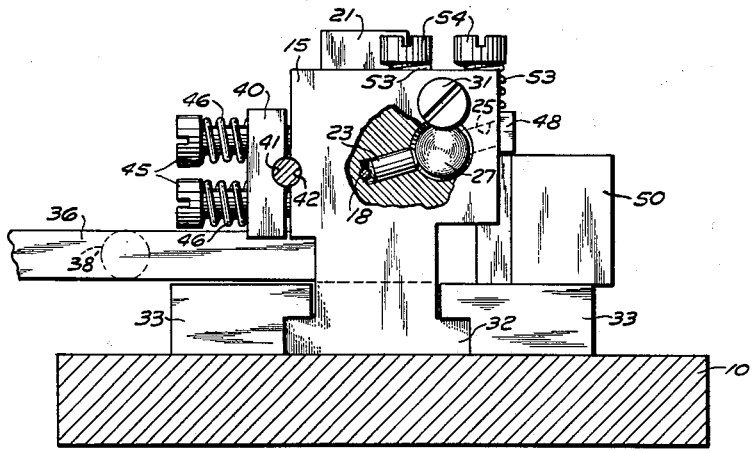
Fig. 3 is a vertical sectional view taken along the line 3—3 of Fig. 1.

The next or feeding motion of the apparatus begins with the start of the movement of the carriage 32 to the right. At the start of this movement, the grippers 40 and 48 constantly holding their projections 43 and 49 of the elements 26 and 27 cause the elements to move simultaneously. The element 26 through the holding force of the gripper 40 is caused to move to the right against its head 30 to remove any applied force to the holder 22. At the same time the gripper 48 holds the element 27 against movement with the unit 15 until it has moved away from its head 31 and into the position shown in Fig. 3 where it will force its holder 23 against the wire and cause the wire to move longitudinally during this feeding motion of the unit 15 and carriage 32. With this structure, the formation and action of the holders 22 and 23 through the action of the elements 26 and 27 are such that there will never be cause for disturbance in the effectiveness of the apparatus, that the holders will be completely free of any applied force when the wire is to move in its respective apertures 16 and 17 and that suitable force will be applied repeatedly to firmly hold the wire against movement in the apertures when it is desired that this should occur.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

A wire feeding apparatus comprising a fixed position unit with an aperture for a wire to be fed in a given direction therethrough, a carriage mounted for reciprocable feeding and reverse movements toward and away from the fixed unit, a movable unit mounted on the carriage, reciprocable therewith toward and away from the fixed unit and having an aperture for the wire aligned with the aperture of the fixed unit, a holder having opposing inner and outer ends movably disposed in each unit so that their inner ends may engage the portions of the wire in the apertures of their units and normally lie free of any applied force adjacent the wire portions, an element movable in each unit between an operated position, where the element will have engaged the outer end of its holder and forced the holder so that the inner end thereof will hold the wire portion against movement in the aperture, and a normal position where its holder will be free of applied force to free the wire to move in the aperture, projections of the elements extending beyond their units, a gripper for the projection of the element for the movable unit mounted at a fixed position adjacent the carriage to cause the element to force the holder in the movable unit against the wire at the start of the movement of the carriage in the feeding direction and to force the element into its normal position at the start of the return movement of the carriage in the reverse direction, and a gripper for the projection of the element for the fixed unit movable with the carriage to force the element into normal position at the start of the feeding movement of the carriage and to cause the element to force the holder in the fixed unit against the wire at the start of the return movement of the carriage.

References Cited in the file of this patent
UNITED STATES PATENTS

| | | |
|---|---|---|
| 1,146,195 | Mills | July 13, 1915 |
| 2,480,700 | Bogart | Aug. 30, 1949 |